United States Patent

[11] 3,608,713

[72] Inventors Peter F. Crosby
Cazenovia, N.Y.;
John H. Lawrence, Decatur, Ga.
[21] Appl. No. 886,052
[22] Filed Dec. 17, 1969
[45] Patented Sept. 28, 1971
[73] Assignee American Chain & Cable Company, Inc.
New York, N.Y.

[54] SKEWED ROLL SORTATION SYSTEM
9 Claims, 3 Drawing Figs.
[52] U.S. Cl. .................................................. 209/74,
198/183
[51] Int. Cl. ................................................... B07c 5/00
[50] Field of Search ........................................... 198/183;
209/74

[56] References Cited
UNITED STATES PATENTS
3,270,861  9/1966  Reed et al. .................. 198/183
3,361,256  1/1968  Harrison ..................... 209/74

Primary Examiner—Richard A. Schacher
Assistant Examiner—Gene A. Church
Attorney—Pennie, Edmonds, Morton, Taylor and Adams ABSTRACT: A sortation conveyor system for selectively distributing articles from a main conveyor to one or more branch conveyors including a main conveyor equipped with a moving bed of freely rotating rollers skewed in the general direction of the branch conveyor and a drive element selectively engageable with the skewed rollers upstream of the branch conveyor to cause rotation thereof and movement of the overlying articles laterally toward the branch conveyor.

PATENTED SEP 28 1971
3,608,713
FIG. 1
FIG. 2
FIG. 3
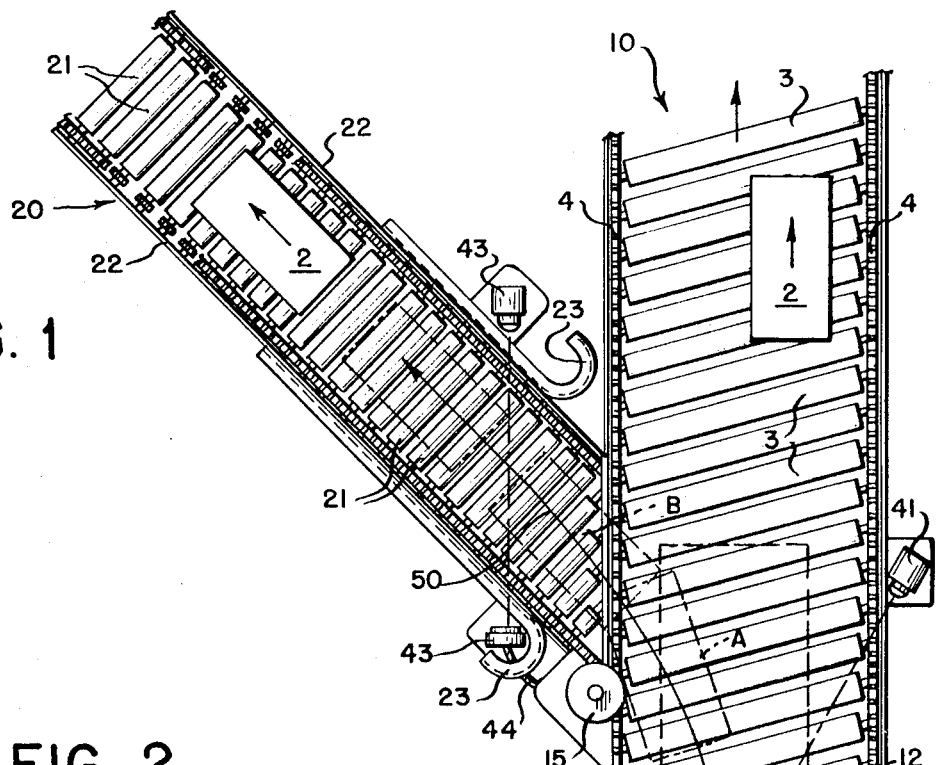
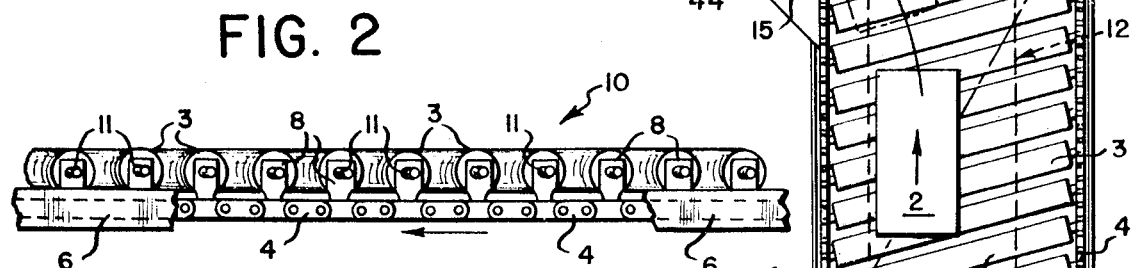
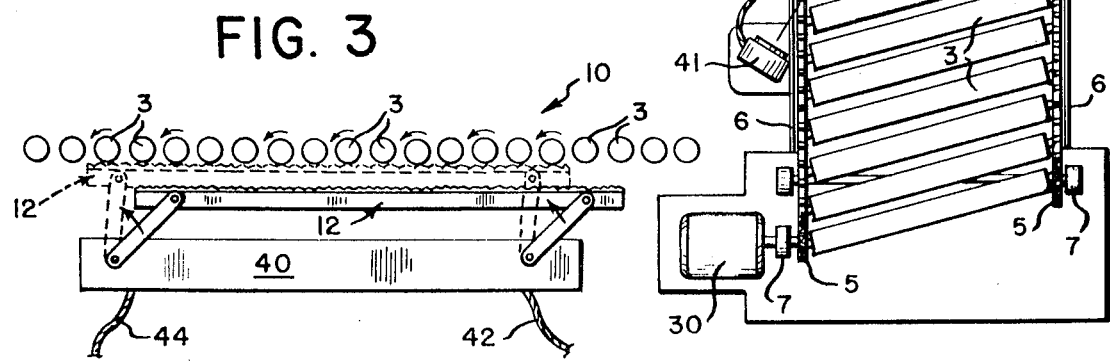
INVENTORS
PETER F. CROSBY
JOHN H. LAWRENCE
BY
ATTORNEYS

SKEWED ROLL SORTATION SYSTEM

FIELD OF THE INVENTION

This invention relates generally to conveyor systems and more particularly to a power driven conveyor system constructed to selectively and continuously distribute a plurality of articles carried thereby from a main conveyor to a branch conveyor.

DESCRIPTION OF THE PRIOR ART

Conventional conveyor systems are typically constructed of a main conveyor and one or more branch or spur conveyors diverging at various angles from the main conveyor. The main conveyor consists of a series of rollers disposed in parallel relationship to each other for providing a moving support surface over which various types of articles such as boxes, crates, etc., are carried. The rollers of the main conveyor are quite often mounted on a pair of endless driven chains disposed in spaced parallel branch relationship thereby effecting a linear procession of articles past the branch or spur conveyors. The junction between any branch conveyor and the main conveyor is commonly referred to as a diverter station and is generally provided with some kind of mechanism for laterally diverting an article arriving at the station onto a branch conveyor. Further manipulation of the diverted article is then assumed by the branch conveyor which for instance, may consist of a gravity operated chute or, if desired, another roller conveyor having a series of freely rotatable rollers which turn under the momentum of the discharged article.

The diverter mechanisms provided in conveyor systems of the prior art are generally highly complex and sophisticated in construction and therefore often require constant maintenance and upkeep to insure dependable operation. Additionally, such conveyor systems are expensive to manufacture and thus the outlay required to purchase such systems is often prohibitive.

In addition to being complex constructions and costly, presently known conveyor systems are quite often unable to handle articles on a production basis with any great degree of efficiency. As any example, some systems are unable to maintain the proper orientation of the diverted article as it passes from the main conveyor onto the branch conveyor. Thus, unless the branch conveyors are dimensioned with an extremely large width, diverted articles are prone to becoming jammed against the side rails of the branch conveyor thereby causing a backup of articles. It will be recognized that the increased width of the branch conveyors necessarily means that the entire conveyor systems will consume more space thereby rendering the use of such a system less attractive and less economically desirable.

Some of the presently available conveyor systems have succeeded in providing diverter mechanisms which are able to maintain the proper orientation of the diverted article relative to the trajectory of the branch conveyor. These conveyor systems, however, generally include additional mechanisms which consist essentially of paddles, pushers, and other deflector devices which are selectively moved into the path of an oncoming article to deflect it toward and onto the branch conveyor. Alternatively, such mechanisms may include claws or other gripping devices which actually grip the sides of an advancing article and either lift or cradle it onto the branch conveyor in the proper orientation for continued travel therealong. In addition to being complicated and expensive, such conveyor systems are not always adjustable for handling articles of different sizes and shapes. Accordingly, the versatility of such conveyor systems is rather limited.

Still further, conveyor systems which have succeeded in solving the orientation problem have at the same time failed to take into consideration that as each article is being diverted, it necessarily spends a relatively protracted time at the diverter station. In this connection, it will be readily apparent that if the continuously advancing articles following behind the article currently being diverted are not spaced sufficiently apart, an undesirable accumulation of articles is very likely to develop at the diverting stage thereby preventing the diverting mechanism from operating properly. It will be recognized that this type of threatened congestion requires that an operator, or suitable automatic means, be provided to see that proper separation between the articles is maintained.

SUMMARY OF THE INVENTION

In accordance with the teachings of the present invention, there is provided a selective sortation system of simple and economical construction and one which is intended for distributing a plurality of articles to a variety of preselected destinations. In construction, the sortation system includes a main conveyor adapted to effect movement of a series of individual articles along a predetermined path extending past one or more diverging branch conveyors. The main conveyor is constructed of a series of parallel freely rotating rollers mounted on a pair of spaced apart endless driven chains. Each individual roller is skewed relative to the path of the main conveyor and generally faces in the direction of the branch conveyors. The branch conveyors, in turn, branch off from one side of the main conveyor; and the individual rollers of the branch conveyors are power driven.

For effecting movement of an article from the main conveyor and onto a branch conveyor, means are provided for imparting rotation to rollers of the main conveyor disposed immediately upstream of the branch conveyor. In construction, this means comprises a friction pad located underneath the upper reach of the upstream portion of main conveyor rollers. The pad is adapted to be selectively raised and lowered into and out of a roller engaging position. When engaging the rollers, they are caused to rotate to, in turn, move the overlying article along the main conveyor at a rate faster than the rate of movement of the main conveyor as a unit; and since these rollers are skewed, they will at the same time cause the overlying article to progress toward the side of the main conveyor and thus toward the branch conveyor. The rollers of the branch conveyor being power driven, assist in the removal of the article off of the main conveyor.

BRIEF DESCRIPTION OF THE DRAWINGS

FIG. 1 is a plan view of the preferred embodiment of the selective sortation system of the invention, showing one branch conveyor;

FIG. 2 is a side elevation of a section of the main conveyor showing the connection of the rollers to the chain drive; and FIG. 3 is a side elevational view of a section of the main conveyor showing the operation of the roller drive means.

DETAILED DESCRIPTION OF THE PREFERRED EMBODIMENT

As shown in FIG. 1, the conveyor system includes an infeed or main conveyor 10 and a lateral outfeed or branch conveyor 20 which diverges at an angle, as for example 45°, form the main conveyor 10. The main conveyor includes an endless series of rollers 3 mounted at each end on a pair of driven endless chains 4. The chains are disposed in spaced parallel relationship about suitable sprockets 5 supported between side frame members 6 by suitable bearing supports 7.

Each chain carries a series of straight lug attachments 8 for supporting the rollers for free rotation. The rollers 3 are mounted on the chains with their shafts extending through holes 11 in the lug attachments 8. As shown, the rollers are disposed in a skewed relationship with the conveyor chains 4 and face generally toward the branch conveyor 20. That is, a line drawn perpendicular to the axis of rotation of the rollers 3 forms a fixed angle relative to the path of movement of the main conveyor 10 as a unit. In the presently preferred construction the rollers 3 are skewed at an angle of 12° to 15° to the longitudinal path of movement of the main conveyor. The holes 11 in the lug attachments 8 are sized to allow skewed orientation of the rollers and to permit articulation as the rollers pass around the end sprockets 5. The main conveyor 10 is further equipped with a suitable motor assembly, shown diagrammatically at 30, for providing drive to one of the sprockets.

With the conveyor construction as described above, a moving support bed of normally stationary but freely rotatable skewed rollers is provided for normally advancing a procession or stream of articles 2 along the longitudinal axis of the main conveyor and past the branch conveyor 20.

In order to provide for selective lateral movement of particular articles onto the branch conveyor, a friction drive for the rollers 3 is located along the main conveyor at a point immediately upstream of the junction formed at the branch conveyor. As shown, the friction drive comprises a friction pad 12 disposed between the upper and lower reaches of the main conveyor. The pad is suitably supported so that it may be raised from an inoperative position as indicated by the solid lines in FIG. 3, where it is out of contact with the upper reach of rollers 3 to an operative position, as indicated by dotted lines in FIG. 3, engaging these rollers. Any suitable means may be incorporated to effect movement of the friction pad, such as for example, in an electrically operated actuator 40. The actuator is controlled by a photoelectric control system which is responsive to movement of articles along both the main and branch conveyors as more fully explained hereinafter.

It will be recognized that by raising the friction pad 12 into contact with the undersurface of the rollers 3 arriving at the friction pad, the travel speed of the article then overlying these rollers will be accelerated to a speed equal to the speed of travel of chains 4 plus the rotational speed of the rollers 3. Since the rollers 3 are now individually caused to rotate and are skewed in a direction toward the branch conveyor, the article carried thereon will simultaneously undergo lateral movement onto the branch conveyor.

In the presently preferred embodiment of this invention, the individual rollers 21 of the branch conveyor are powered. The rollers are carried by a suitable supporting frame work 22 and flanked on each side by guide rail 23 for centering diverted articles and insuring that they are not accidentally shifted so as to fall from the supporting surface thereof. Alternatively, by way of further example, the branch conveyor may be of a type which is provided with a moving bed such as a driven belt-type or a roller slat conveyor wherein the rollers are mounted on driven chains to effect translational movement of the roller slat bed.

Several important advantages are secured by the use of a powered branch conveyor. In this connection, it will be recognized that such a conveyor will assist in the transfer of a diverted article onto the branch conveyor since it actually exerts a pull on the diverted articles 2 as they come off the main conveyor. More importantly, however, such a conveyor, by reason of the pull it exerts on the diverted articles, acts to adjust their orientation so as to bring them into alignment with the trajectory of the branch conveyor, thereby to a large measure preventing them from becoming jammed or wedged up against the side rails of the branch conveyor. This adjustment is positively augmented by the inclusion of a freely rotatable pivot wheel 15 mounted alongside the main conveyor 10 at its upstream point of intersection with the branch conveyor 20. Thus, as a diverted article is laterally shifted toward the branch conveyor 20 under the influence of the individually rotating skewed rollers of the main conveyor 10, it will engage the pivot wheel 15 and as the powered branch conveyor gradually begins to pull it from the main conveyor, the article very gently pivots on the pivot wheel 15 and enters a trajectory in alignment with the trajectory of the branch conveyor. The powered branch conveyor then takes over manipulation of the article and carries it smoothly away to the proper destination.

It is to be observed that the combined action of the powered branch conveyor 20, the pivot wheel 15, and the skewed orientation of the main conveyor rollers 3 serves to effect a gradual movement of the diverted article over a smooth and gradual arcuate path, indicated by arrow 50, without any abrupt and possible damaging changes in direction. In this regard, the skewed orientation of the main conveyor rollers becomes particularly important since it will be recognized that the degree of skew controls the initial abruptness of the change in direction of the diverted article. Thus, in order to provide a smooth and relatively arcuate path for a diverted article from the main to branch conveyor, the main conveyor rollers 3 are also skewed with respect to the flow direction of the branch conveyor 20. That is, a line drawn perpendicular to the axis of rotation of the main conveyor rollers 3 also forms a fixed angle with the flow direction of the branch conveyor 20. With this arrangement, a particular article to be diverted is subjected to a lateral shift toward the branch conveyor rather than an actual lateral thrust onto the branch conveyor. If, however, a more abrupt lateral thrust is desired, such is easily accomplished simply by adjusting the positioning of the skewed main conveyor rollers.

The described sortation system is, in the preferred embodiment of the invention, automatically controlled by the advancing articles themselves. For this purpose, there is provided a control system which is responsive to movement of the articles along both the main and branch conveyors. More particularly, the control system comprises a detector or sensing element 41 which is connected electrically to the friction pad actuator 40 via the cable 42. The sensing element 41 is mounted alongside the main conveyor 10 upstream of the branch conveyor 20. The sensing element 41 may be of any of several well-known forms capable of identifying articles as they move along the main conveyor 10 toward the branch conveyor. For instance, the sensing element may consist of a photoelectric cell capable of reading coded labels secured to those articles which are to be diverted.

The control system further includes a detector or sensing element 43 mounted alongside the branch conveyor at a point near the intersection of the branch and main conveyors. The sensing element 43 is electrically connected to the friction pad actuator 40 via a cable 44 and is capable of detecting the passage of an article as it moves along the branch conveyor. This sensing element may be any one of several well-known forms, such as, for example, a suitable photoelectric cell. Upon activation, the sensing element 43 is operative to deactivate the actuator 40 and thus cause lowering of the friction pad 12 into an inoperative position.

In operation, the moving bed of the main conveyor 10 moves a line or procession of articles 2 past the sensing element 41 which, in turn, operates to cause a particular article to be diverted onto the branch conveyor 20 or, alternatively, to continue its travel along the main conveyor 10. When an article to be diverted to the branch conveyor is identified, the sensing element 41 emits an electrical signal which passes through cable 42 to activate actuator 40 and thus raise the friction pad 12 into its uppermost position in engagement with the underside of the main conveyor rollers 3 thereby causing them to rotate. Because of the skewed position of the main conveyor rollers, the overlying article, which is marked for diversion and last identified as such by sensing element 41, is caused to be laterally shifted toward the branch conveyor into position A shown by dotted lines in FIG. 1. In this position, it will be seen that the diverted article abuts against the pivot wheel 15 with its leading corner portion overlying the powered rollers 21 of the branch conveyor 20. From this point, aided by the push of the rotating skewed rollers of the main conveyor 10, the pull of the powered rollers 21 of the branch conveyor 20, and the presence of pivot wheel 15, the diverted article is caused to undergo a gentle turning, translational movement onto the branch conveyor and into alignment with the trajectory thereof. Eventually, the diverted article is carried into position B as shown in dotted lines in FIG. 1, whereupon the sensing element 43 detects its presence and emits an electrical signal which passes through cable 44 to deactivate the friction pad actuator 40 and thereby lower the friction pad 12 into its inoperative position spaced from the main conveyor rollers 3. This sequence occurs unless the next succeeding article has already passed in front of the sensing element 41 and been sensed as one that is to be diverted. In this situation, sensing element 41 overrides sensing element 42.

The above description of the present invention has been made with reference to the preferred embodiment; however, it is to be understood that various changes may be made thereto without departing from the scope of the invention as set forth in the following claims.

We claim:

1. A sortation system comprising:
   a. a main conveyor having a plurality of rotatable rollers mounted for movement along a predetermined path for transporting a plurality of articles thereon, said rollers being skewed relative to said path of movement toward one side of said main conveyor;
   b. at least one branch conveyor forming a junction with the main conveyor and diverging from said predetermined path of movement, said branch conveyor being on the one side of said main conveyor toward which the rollers of the main conveyor are skewed; and
   c. means for selectively imparting rotation to the rollers of said main conveyor located immediately upstream of said junction to direct an article overlying the rotated rollers toward and onto said branch conveyor.

2. A sortation system according to claim 1 including:
   a. power drive means for mounting the rollers of the main conveyor for movement as a unit along said predetermined path.

3. A sortation system according to claim 2 wherein said means for selectively imparting rotation to the rollers of the main conveyor includes:
   a. A friction member positioned immediately upstream of said junction and mounted for movement from a first position spaced from the rollers of The main conveyor disposed immediately upstream of said junction to a second position in engagement therewith; and
   b. means for selectively moving said friction member between said first and second positions.

4. A sortation system according to claim 3 further including:
   a. first sensing and control means responsive to movement of said articles along said predetermined path on said main conveyor to selectively raise said friction member into engagement with the rollers of said main conveyor upon sensing of an article to be diverted onto said branch conveyor.

5. A sortation system according to claim 4 further including:
   a. second sensing and control means responsive to movement of a diverted article onto the branch conveyor for moving said friction member to said first position spaced from the rollers of said main conveyor.

6. A sortation system according to claim 5 wherein:
   a. said branch conveyor includes a plurality of power driven rollers.

7. A sortation system according to claim 6 further including:
   a. pivot means disposed at the junction of said main and branch conveyors on the upstream side thereof, said pivot means being disposed in the path of lateral movement of an article being diverted to said branch conveyor for engagement with the side thereof.

8. A sortation system according to claim 3 wherein:
   a. the branch conveyor diverges from the main conveyor at an acute angle; and
   b. the rollers of said main conveyor are skewed at an angle less than said acute angle.

9. A sortation system according to claim 8 wherein:
   a. said acute angle is about 45°; and
   b. the rollers of said main conveyor are skewed at an angle of 15°.